United States Patent
Kim

(10) Patent No.: US 9,386,074 B2
(45) Date of Patent: Jul. 5, 2016

(54) METHOD AND APPARATUS FOR PROVIDING CLOUD SERVICE, AND SYSTEM HAVING THE SAME

(71) Applicant: HUMAX CO., LTD., Seongnam-si, Gyeonggi-do (KR)

(72) Inventor: Tae Gap Kim, Seongnam-si (KR)

(73) Assignee: Humax Co., Ltd., Seongnam-si (KR)

(*) Notice: Subject to any disclaimer, the term of this patent is extended or adjusted under 35 U.S.C. 154(b) by 227 days.

(21) Appl. No.: 14/048,823

(22) Filed: Oct. 8, 2013

(65) Prior Publication Data

US 2014/0189068 A1  Jul. 3, 2014

(30) Foreign Application Priority Data

Dec. 28, 2012 (KR) .................. 10-2012-0156463

(51) Int. Cl.
  *G06F 15/16* (2006.01)
  *H04L 29/08* (2006.01)
  *H04L 12/28* (2006.01)

(52) U.S. Cl.
  CPC ............ *H04L 67/02* (2013.01); *H04L 12/2838* (2013.01); *H04L 67/16* (2013.01)

(58) Field of Classification Search
  CPC .................. H04N 21/43615; H04N 21/4622; H04N 21/482; H04L 67/02; H04L 12/2812; H04L 67/42; H04L 12/282
  USPC ............ 709/201, 219, 217; 370/235; 707/769
  See application file for complete search history.

(56) References Cited

U.S. PATENT DOCUMENTS

| | | |
|---|---|---|
| 2005/0185658 A1 | 8/2005 | Kamiwada et al. |
| 2010/0082725 A1* | 4/2010 | Onishi ................... 709/201 |
| 2010/0119069 A1* | 5/2010 | Kamikura et al. ........... 380/255 |
| 2012/0209960 A1* | 8/2012 | Harwell et al. ............. 709/217 |
| 2013/0007222 A1* | 1/2013 | Ichie et al. ................. 709/219 |
| 2013/0291087 A1* | 10/2013 | Kailash ............... H04L 63/1425 726/11 |
| 2014/0082012 A1* | 3/2014 | Pichumani et al. ........... 707/769 |
| 2014/0226487 A1* | 8/2014 | Forssell et al. .............. 370/235 |

OTHER PUBLICATIONS

Over Daniel Díaz-Sánchez (Media Cloud: An Open Cloud Computing Middleware for Content Management, IEEE Transactions on Consumer Electronics, vol. 57, No. 2, May 2011).*

Belimpasakis et al., "Home Media Atomizer: Remote Sharing of Home Content—without Semi-trusted Proxies", IEEE Transactions on Consumer Electronics, vol. 54, No. 3, Aug. 2008, pp. 1114-1122.

* cited by examiner

*Primary Examiner* — Dhairya A Patel

(74) *Attorney, Agent, or Firm* — Birch, Stewart, Kolasch & Birch, LLP

(57) ABSTRACT

Disclosed is a system for providing a cloud service. The system includes an integrated cloud providing unit which integrates contents information which is transmitted from at least one digital media server (DMS) which is connected to a first network, and provides contents to a terminal which is connected through a second network, based on the integrated contents information, and a connection management unit which manages connection of the terminal to the first network using identification information of the least one DMS.

12 Claims, 6 Drawing Sheets

METHOD AND APPARATUS FOR PROVIDING CLOUD SERVICE, AND SYSTEM HAVING THE SAME

Priority to Korean patent application number No. 10-2012-0156463 filed on Dec. 28, 2012, the entire disclosure of which is incorporated by reference herein, is claimed.

BACKGROUND OF THE INVENTION

1. Field of the Invention

The present invention relates to an apparatus and method for providing a cloud service, and a system including the same, and more particularly, to an apparatus and method for sharing contents by providing a cloud service based on a digital living network alliance (DLNA) in a local network, and a system including the same.

2. Discussion of the Related Art

Digital living network alliance (DLNA) standardization for compatibility between various devices, such as a digital audio-visual (AV) apparatus and a personal computer, which are connected by a home network, is in continuous progress. As such, contents such as music, moving images, and still images may be shared between various devices within the home network.

Devices, which are DLNA-authenticated within the home network, are mutually compatible through wired and wireless networks. In other words, the DLNA allows digital devices, such as electronic appliances of different manufacturing companies, personal computers, and wireless devices, to share contents by connecting to each other through a wired or wireless home network, based on a universal plug and play (UPnP).

However, in the DLNA, contents may be shared between indoor devices, but the contents, which are provided from an indoor digital media server (DMS), may not be accessible from an outdoor place.

SUMMARY OF THE INVENTION

An object of the present invention is to provide an apparatus and method for providing a digital living network alliance (DLNA)-based cloud service capable of sharing all integrated contents in an outdoor place as well as an indoor place by providing a cloud service based on the DLNA in a local network, and a system having the same.

In accordance with an aspect of the present invention, a system for providing a cloud service includes an integrated cloud providing unit which integrates contents information which is transmitted from at least one digital media server (DMS) which is connected to a first network, and provides contents to a terminal which is connected through a second network, based on the integrated contents information, and a connection management unit which manages connection of the terminal to the first network using identification information of the least one DMS.

The integrated cloud providing unit integrate contents information transmitted from the at least one digital media server to generate an integrated contents list.

The integrated cloud providing unit may search for a uniform resource locator (URL) of contents which may be provided from the first DMS, based on the integrated contents list, when the terminal selects the contents of the first DMS.

The integrated cloud providing unit may transmit the URL of the contents selected by the terminal to the first DMS to request the contents corresponding to the URL of the contents selected by the terminal to be provided by streaming.

The connection management unit may allocate identification information of the at least one DMS to share the identification with the integrated cloud providing unit.

The identification information may include an identifier and a password of the at least one DMS, and the connection management unit may share the identifier with the terminal if the terminal requests connection through the second network.

The connection management unit may block or approve connection of the terminal to the first network according to a result of checking the password if the terminal transmits the password for the identifier of the first DMS.

The connection management unit may transmit an identifier of the terminal and the identifier of the first DMS to the integrated cloud providing unit if connection of the first terminal to the first network is approved.

In accordance with another aspect of the present invention, a method of providing a cloud service includes sharing, by a connection management unit, the identification information with an integrated cloud providing unit by allocating identification information of at least one digital media server (DMS) which is connected by a first network, determining, by the connection management unit, whether to approve connection of a terminal which tries to connect to the first network through a second network using the identification information, integrating, by the integrated cloud providing unit, contents information which is transmitted from the at least one DMS, and providing, by the integrated cloud providing unit, contents to the terminal, based on integrated contents information if connection of the terminal is approved.

The integrating may include integrating, by the integrated cloud providing unit, the contents information to generate an integrated contents list, and searching, by the integrated cloud providing unit, for a uniform resource locator (URL) of contents which may be provided from the first DMS, based on the integrated contents list, when the terminal selects the contents of the first DMS.

The integrated cloud providing unit may transmit the URL of the contents selected by the terminal to the first DMS to request the contents corresponding to the URL of the contents selected by the terminal to be provided by streaming.

The identification information may include an identifier and a password of the at least one DMS, wherein the sharing includes sharing, by the connection management unit, the identifier with the terminal if the terminal requests connection through the second network, and blocking or approving, by the connection management unit, connection of the terminal to the first network according to a result of checking the password if the terminal transmits the password for the identifier of the first DMS.

The sharing may include transmitting, the connection management unit, an identifier of the terminal and the identifier of the first DMS to the integrated cloud providing unit if connection of the first terminal to the first network is approved.

In accordance with yet another aspect of the present invention, a n apparatus for providing a cloud service includes a contents integration unit which integrates contents information which is transmitted from at least one digital media server (DMS) which is connected to a first network, a contents search unit which searches for contents which is selected by a terminal which is connected through a second network based on the integrated contents information, and a contents providing unit which requests contents selected by the terminal to be provided to the at least one DMS.

In accordance with further yet another aspect of the present invention, a method of providing a cloud service includes integrating contents information which is transmitted from at least one digital media server (DMS) which is connected to a first network, searching for contents which is selected by a terminal which is connected through a second network based on the integrated contents information, and requesting contents selected by the terminal to be provided to the at least one DMS.

In accordance with further yet another aspect of the present invention, an apparatus for providing a cloud service includes an allocation unit which allocates identification information of at least one digital media server (DMS) which is connected to a first network, a connection confirmation unit which determines whether to approve connection to the first network using the identification information of the at least one DMS if a terminal requests connection to the first network through a second network, and an information management unit which requests an identifier to the terminal if connection of the terminal to the first network is approved.

In accordance with further yet another aspect of the present invention, a method of providing a cloud service includes allocating identification information of at least one digital media server (DMS) which is connected to a first network, determining whether to approve connection to the first network using the identification information of the at least one DMS if a terminal requests connection to the first network through a second network, and requesting an identifier to the terminal if connection of the terminal to the first network is approved.

DETAILED DESCRIPTION OF THE EMBODIMENTS

Figure 1:
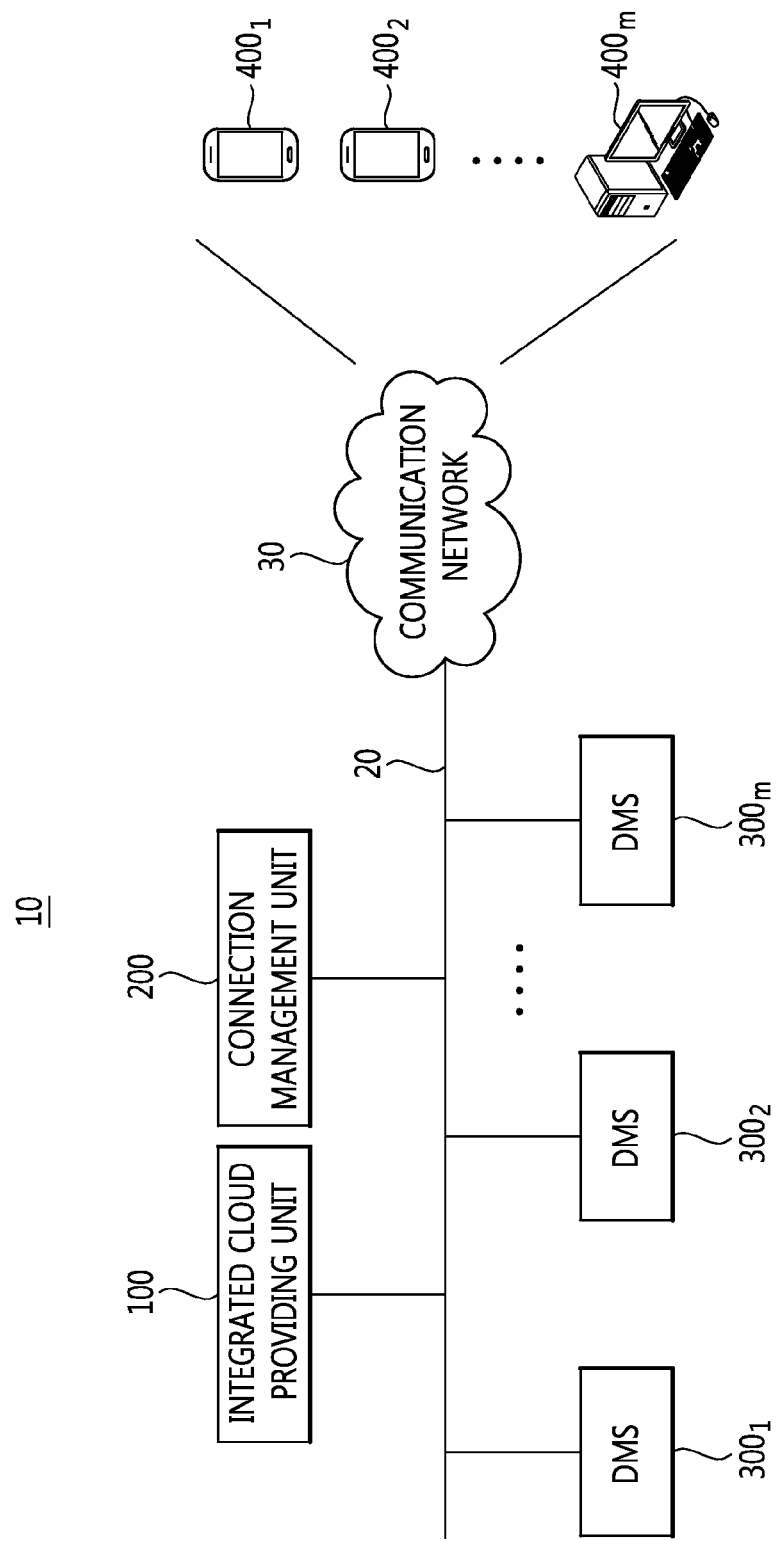
FIG. 1 is a diagram illustrating an example of a system for providing a digital living network alliance (DLNA)-based cloud service according to an embodiment of the present invention.

Hereinafter, embodiments of the present invention will be described in detail with reference to the accompanying drawings so that they can be readily implemented by those skilled in the art.

Hereinafter, some embodiments of the present invention are described in detail with reference to the accompanying drawings in order for a person having ordinary skill in the art to which the present invention pertains to be able to readily implement the invention. It is to be noted the present invention may be implemented in various ways and is not limited to the following embodiments. Furthermore, in the drawings, parts not related to the present invention are omitted in order to clarify the present invention and the same or similar reference numerals are used to denote the same or similar elements.

Terms such as "including," "having," "consist of" may be intended to indicate a plurality of components unless the terms are used with the term "~only". In the case where a position relationship between two items are described with the terms "on ~," "on the top of ~," or the like, one or more items may be interposed therebetween unless a description is given without the term "directly".

The objects and effects of the present invention can be naturally understood or become clear by the following description, and the objects and effects of the present invention are not restricted by the following description only.

The objects, characteristics, and merits will become more apparent from the following detailed description. Furthermore, in describing the present invention, a detailed description of a known art related to the present invention will be omitted if it is deemed to make the gist of the present invention unnecessarily vague. A preferred embodiment in accordance with the present invention is described in detail below with reference to the accompanying drawings.

FIG. 1 is a diagram illustrating an example of a system for providing a digital living network alliance (DLNA)-based cloud service according to an embodiment of the present invention.

As illustrated in FIG. 1, a system 10 for providing a personal cloud service based on DLNA according to an embodiment of the present invention includes an integrated cloud providing unit 100, a connection management unit 200, a digital media servers (DMS) ($300_1$-$300_n$) and terminals ($400_1$-$400_m$; hereinafter, integrally referred to as reference numeral 400).

The integrated cloud providing unit 100 integrates all contents information transmitted from DMS ($300_1$-$300_n$) connected by the home network as well as its own contents to provide a cloud service based on the DLNA, and transmits the contents which have been requested by the terminal 400 through the communication network 30 based on the integrated contents information. Such an integrated cloud providing unit 100 may be a TCP/IP-based server which may transmit contents through an indoor/outdoor network, and plays a role of a server device which provides computing resources in a general cloud service based on the DLNA. The home network 20 according to an embodiment of the present invention is a local network which shares and replays moving images, music files, and still images that are stored in an indoor personal computer, a mobile phone, a camera, etc., based on the DNLA, and the communication network 30 is an external network which is externally connected to connect to the indoor home network 20, and includes a mobile communication network and an Internet network.

In detail, the integrated cloud providing unit 100 is internally (indoor) connected to the connection management unit 200 and the DMS ($300_1$-$300_n$) through the home network 20. The integrated cloud providing unit 100 receives uniform resource locator (URL) information of all contents held by each DMS ($300_1$-$300_n$) which provides different contents, and collects the information and generates an integrated contents list. In other words, the integrated contents list is generated by classifying the URL of contents which may be provided for each DMS ($300_1$-$300_n$) as well as contents which may be provided in the cloud providing unit 100 and then collecting the URL information. The integrated contents list according to an embodiment of the present invention may be generated by integrating all contents which are transmitted from the DMS ($300_1$-$300_n$) without distinction for each DMS ($300_1$-$300_n$). Here, the contents may include various media types such as songs of an MP3 player, a slide of still images, movies in a DVD-jukebox, a TV schedule, AV files, etc.

Furthermore, the integrated cloud providing unit 100 is externally (outdoor) connected to the terminal 400 through the communication network 30. If the terminal 400 is connected through the communication network 30 and requests contents, the integrated cloud providing unit 100 searches for the contents from the integrated contents list, and sets the contents to be provided by streaming.

The connection management unit 200 allocates identification information to the DMS ($300_1$-$300_n$), and stores the identification information. Here, the identification information is an identifier for distinguishing each DMS ($300_1$-$300_n$) and a password corresponding thereto. If a connection is requested through the communication network 30 in order for the terminal 400 to request contents, the connection management unit 200 shares the identifier of each DMS ($300_1$-$300_n$), which is connected to the home network 20, with the terminal. If a password for a specific DMS which the user tries to connect to through the terminal 400, the connection management unit 200 checks the password. IF the password is correct, the connection management unit 200 requests the identifier such as the IP address, the Mac address, and the phone number of the terminal 400. The connection management unit 200 transmits the identifier of the terminal 400 and the identifier of the DMS to the integrated cloud providing unit 100 to notify that the terminal 400 in an outdoor place requests contents. According to an embodiment of the present invention, the identifier has been requested to the terminal 400 which is connected through the connection management unit 200, but the embodiments of the present invention are not limited thereto, and if the terminal 400 is connected in a state where the terminal 400 has been registered in advance, through the connection management unit 200, the terminal may be identified by using advance-registered information without a process of requesting a separate identifier.

The DMS ($300_1$-$300_n$) provides contents on the home network 20. Here, a set-top box, a desktop computer, a notebook personal computer which supports mobility, etc. may play a role of the DMS. The DMS ($300_1$-$300_n$) may perform a function of a digital media player (DMP) which selects media contents on the home network and replays the selected contents. If the integrated cloud providing unit 100 requests transmission of the contents to the terminal 400, the DMS ($300_1$-$300_n$) provides the contents by streaming.

The terminal 400 is a terminal which allows a communication function using a communication network 30 such as a mobile communication network or an Internet network. The terminal 400 may be a general personal computer such as a desktop computer as well as a mobile device such as a smart phone or a tablet PC. Furthermore, the terminal 400 may be a terminal connected by a private IP as well as a terminal connected by a public IP from an outdoor place.

It was illustrated above that the integrated cloud providing unit 100 and the connection management unit 200 separately operate, but one or more embodiments of the present invention are not limited thereto, and the integrated cloud providing unit 100 and the connection management unit 200 may be integrated into one device and perform the same function.

Figure 2:
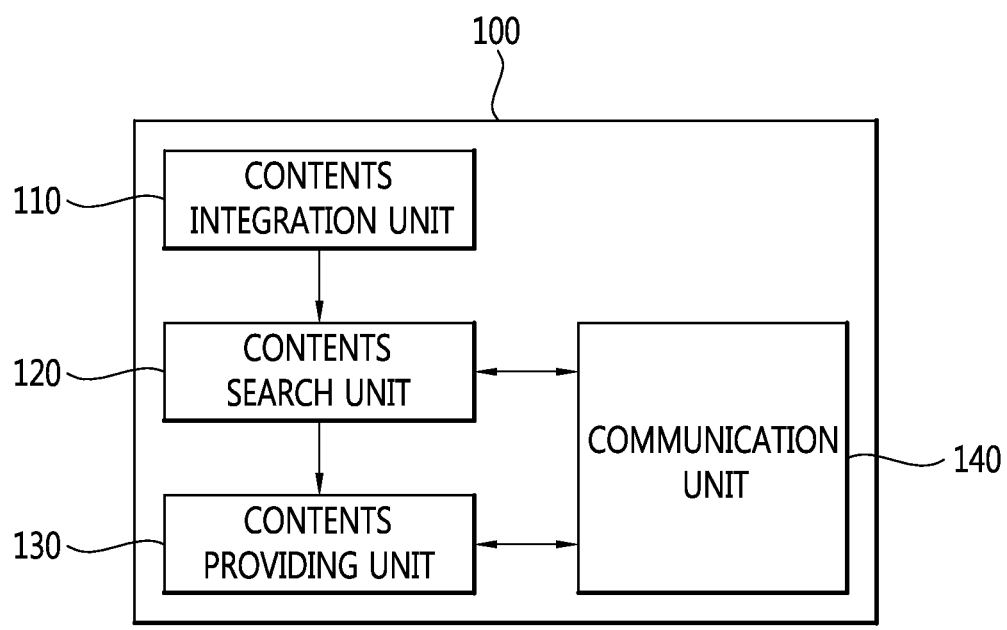
FIG. 2 is a block diagram schematically illustrating an integrated cloud providing unit according to an embodiment of the present invention.

FIG. 2 is a block diagram schematically illustrating an integrated cloud providing unit according to an embodiment of the present invention.

As illustrated in FIG. 2, the integrated cloud providing unit 100 according to an embodiment of the present invention includes a contents integration unit 110, a contents search unit 120, a contents providing unit 130, and a communication unit 140.

The contents integration unit 110 requests each DMS ($300_1$-$300_n$) to transmit all contents information which may be provided from the DMS ($300_1$-$300_n$) connected on the home network 20. Here, the contents information includes URL information through which the user may connect to the contents. The contents integration unit 110 receives all contents information from the DMS ($300_1$-$300_n$). The contents integration unit 110 collects all transmitted contents information as well as its own contents to generate an integrated contents list. The contents integration unit 110 transmits the integrated contents list to the contents search unit 120.

The contents search unit 120 receives the integrated contents list from the contents integration unit 110 and stores the integrated contents list. Furthermore, after the terminal 400 connects to the connection management unit 200 through the communication network 300, if the contents of the specific DMS is requested, the contents search unit 120 receives the identifier of the specific DMS and the identifier of the terminal 400 from the connection management unit 200. The contents search unit 120 searches for the URL of the contents, which may be provided from the specific DMS, based on the integrated contents list. The contents search unit 120 transmits the URL of the contents, which may be provided from the specific DMS, to the contents providing unit 130. It was illustrated above that the URL of the contents is provided form a specific DMS, but one or more embodiments of the present invention are not limited thereto, and the entire URL included in the integrated contents list may be provided or only the URL of the contents requested by the user may be provided.

The contents providing unit 130 receives the URL of the contents which may be provided from the specific DMS, and the identifier of the terminal 400, from the contents search unit 120. The contents providing unit 130 transmits the URL of the contents which may be provided from the specific DMS, to the terminal 400 through the communication unit 140. Furthermore, if the user selects one of the URLs of the contents which are provided from the specific DMS, through the terminal 400, the contents providing unit 130 transmits the identifier of the terminal 400 and the URL of the contents to the specific DMS to request to providing the contents selected by the user of the terminal 400 by streaming.

The communication unit 140 performs communication with the connection management unit 200 through the home network 20 so that the cloud service may be possible based on the DLNA, and performs communication with the terminal 400 through the communication network 30. For example, the communication unit 140 transmits the integrated contents list to the terminal 400 through the communication network 30, or notifies the contents providing unit 130 of the URL of the contents selected by the terminal among the integrated contents list. Furthermore, if the identifier of the terminal 400 and the identifier of the specific DMS are transmitted from the connection management unit 200 through the home network 20, the communication unit 140 transmits the identifier of the terminal 400 and the identifier of the specific DMS to the contents providing unit 130.

Figure 3:
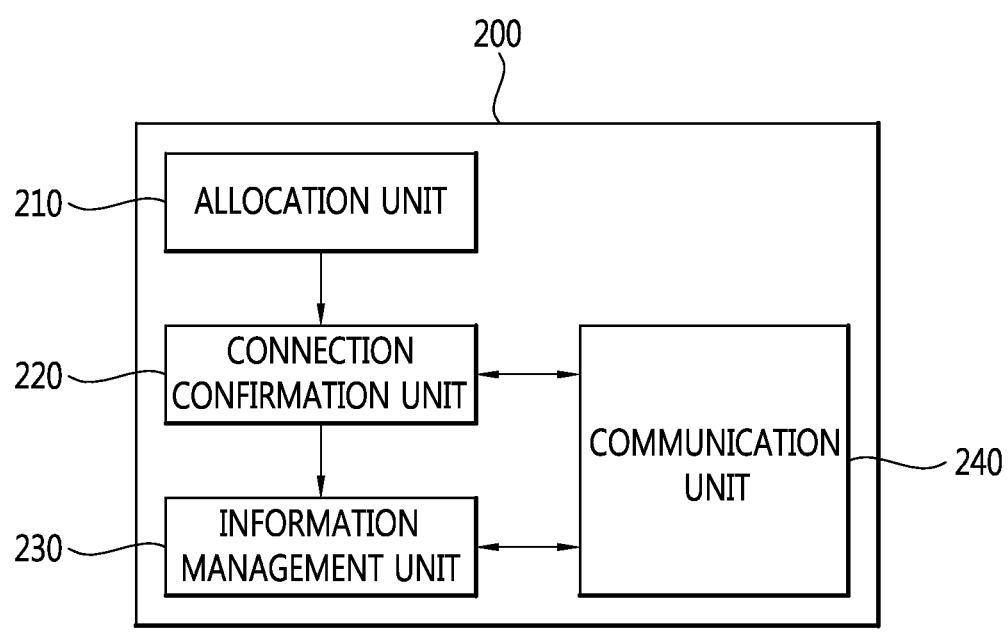
FIG. 3 is a block diagram schematically illustrating a connection management unit according to an embodiment of the present invention.

FIG. 3 is a block diagram schematically illustrating a connection management unit according to an embodiment of the present invention.

As illustrated in FIG. 3, the connection management unit 200 according to an embodiment of the present invention includes an allocation unit 210, a connection confirmation unit 220, an information management unit 230, and a communication unit 240.

The allocation unit 210 allocates the identifier and password for the DMS ($300_1$-$300_n$) connected through the home network. Furthermore, the allocation unit 210 shares the identifier and password of the DMS ($300_1$-$300_n$) with the connection confirmation unit 220 and the integrated cloud providing unit 100.

If the terminal 400 requests connection to request the contents, the connection confirmation unit 220 shares the identifier of the DMS ($300_1$-$300_n$) connected to the home network, with the terminal 400. If the user inputs the password for the specific DMS, the connection confirmation unit 220 determines whether the password allocated to the specific DMS coincides with the inputted password. If the password allocated to the specific DMS coincides with the inputted password, the connection confirmation unit 220 informs the information management unit 230 of the coincidence. If the password allocated to the specific DMS does not coincide with the inputted password, the connection confirmation unit 220 blocks the connection of the terminal 400 to the indoor network. It is assumed here that the terminal 400 shares the password with the identifier of the DMS ($300_1$-$300_n$) in advance before the terminal 400 connects to an indoor place.

If the password allocated to the specific DMS coincides with the inputted password, the information management unit 230 requests the identifier of the terminal 400. The information management unit 230 receives the identifier of the terminal 400, and transmits the identifier of the specific DMS and the identifier of the terminal 400 to the integrated cloud providing unit 100.

The communication unit 240 performs communication with the integrated cloud providing unit 100 through the home network 20 so that the cloud service is possible based on the DLNA, and performs communication with the terminal 400 through the communication network 30. For example, if the terminal 400 tries connection through the communication unit 240 to request the contents, the communication unit 240 transmits the identifier of the DMS ($300_1$-$300_n$) to the terminal 400 to sharing or receives the identifier of the terminal 400 and transmits the identifier of the terminal 400 to the information management unit 230. Furthermore, the communication unit 240 transmits the identifier of the DMS and the identifier of the terminal 400 to the integrated cloud providing unit 100 through the home network 20.

Figure 4:
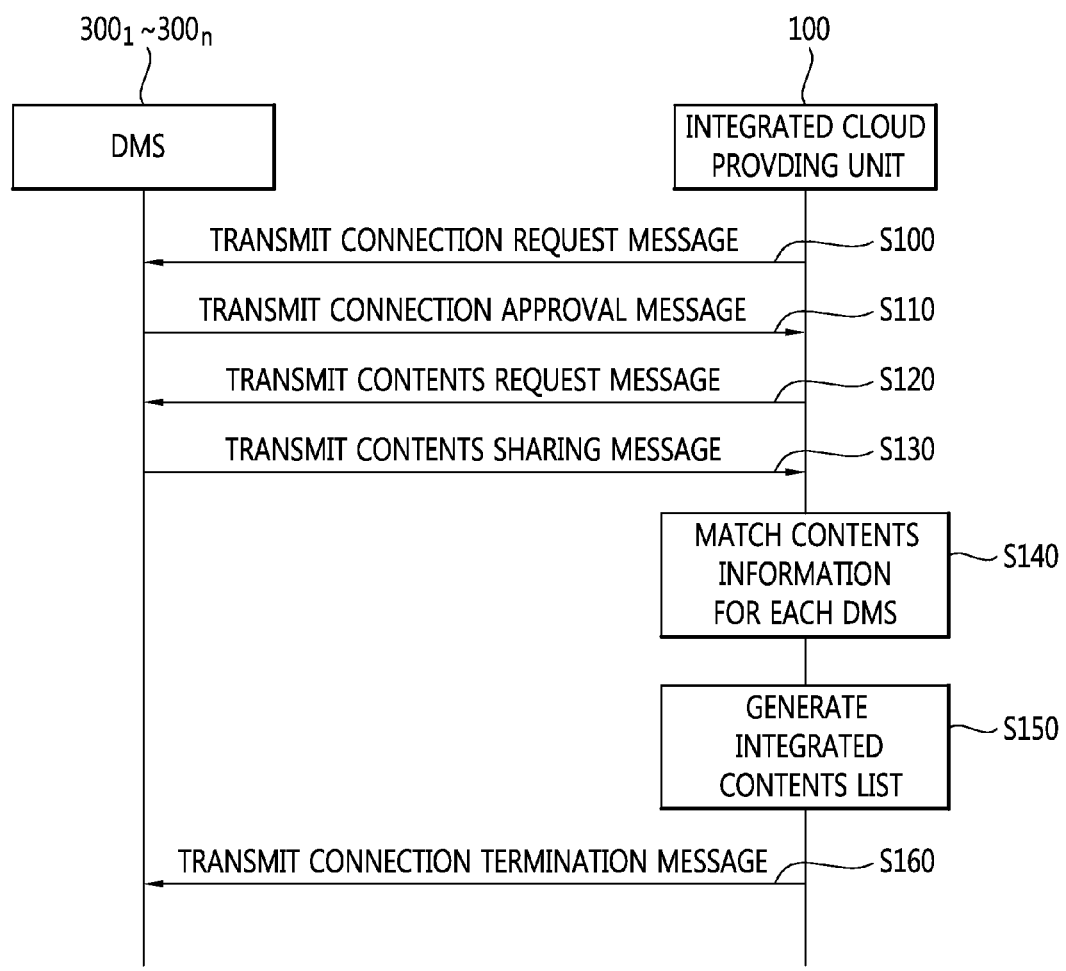
FIG. 4 is a diagram illustrating a method of integrating contents within a home network based on the DLNA according to an embodiment of the present invention.

FIG. 4 is a diagram illustrating a method of integrating contents within a home network based on the DLNA according to an embodiment of the present invention.

As illustrated in FIG. 4, the integrated cloud providing unit 100 transmits the connection request message to the DMS ($300_1$-$300_n$) connected to the home network 20 to start contents integration within the home network based on the DLNA according to an embodiment of the present invention (S100). The DMS ($300_1$-$300_n$) transmits the approval message to the integrated cloud providing unit 110 in response to the connection request message (S110).

The integrated cloud providing unit 100 transmits the contents request message to each DMS ($300_1$-$300_n$) to request all contents information which may be provided (S120). Then the DMS ($300_1$-$300_n$) transmits the contents sharing message including the contents information to the integrated cloud providing unit 100 (S130).

The integrated cloud providing unit 100 analyzes the contents-sharing message to determine from which DMS the message has been transmitted, and matches the identifier for the DMS to the contents information and stores the matching result (S140). The integrated cloud providing unit 100 generates the integrated contents list by collecting the matching result as well as its own contents (S150).

The integrated cloud providing unit 100 transmits the connection termination message to the DMS ($300_1$-$300_n$) to notify that the generation of the integrated contents list has been completed, and thus the sharing of the contents may be terminated (S160).

Figure 5:
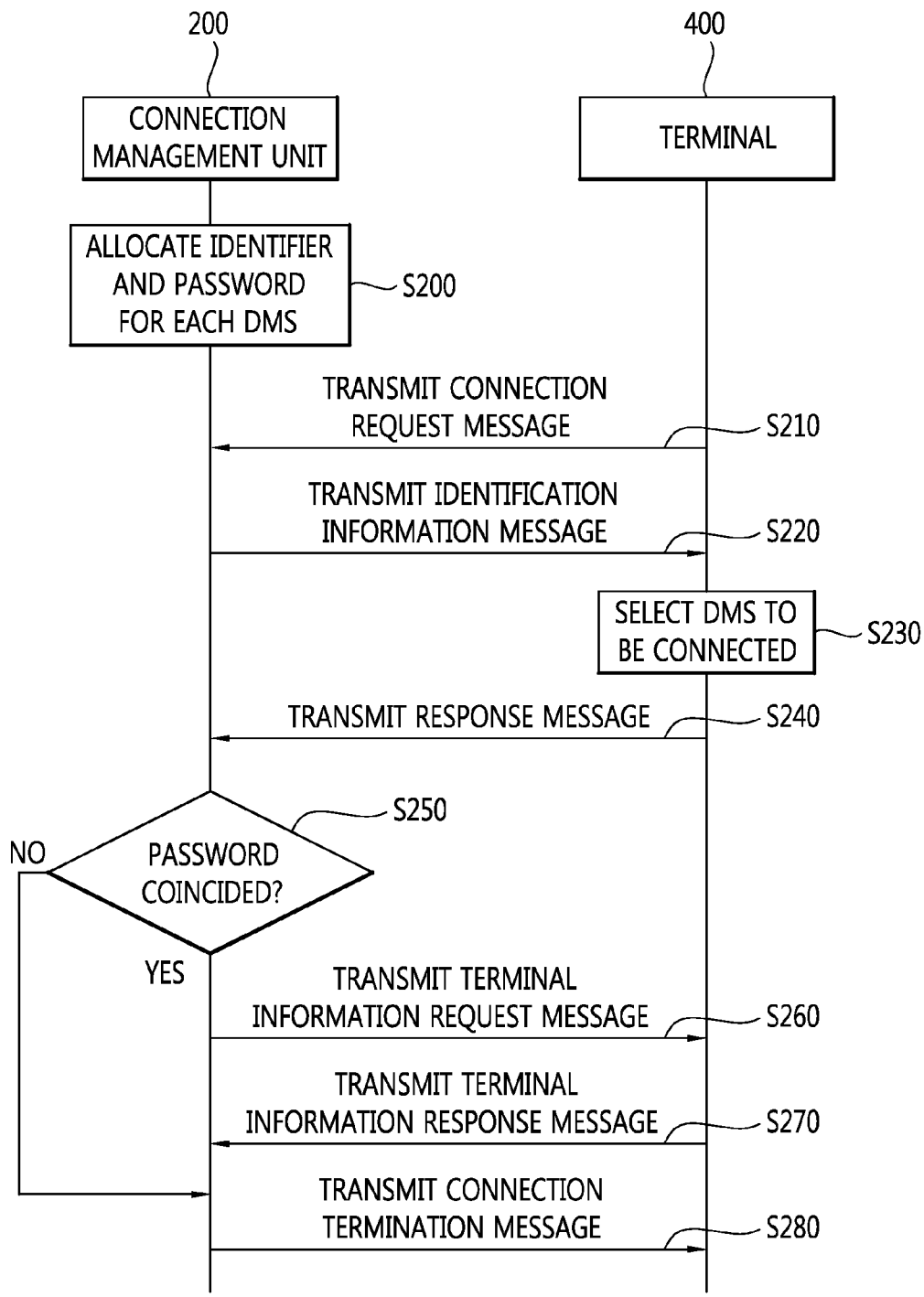
FIG. 5 is a flowchart illustrating a method in which a terminal located in an outdoor place connects to a DLNA-based home network according to an embodiment of the present invention.

FIG. 5 is a flowchart illustrating a method in which a terminal located in an outdoor place connects to a DLNA-based home network according to an embodiment of the present invention.

As illustrated in FIG. 5, the connection management unit 200 allocates the identifier and password for each DMS ($300_1$-$300_n$) which is connected through the home network 20 before the terminal located in an outdoor place according to an embodiment of the present invention connects to the home network based on the DLNA (S200).

The terminal 400 transmits the connection request message to the connection management unit 200 through an external communication network 30 to request contents (S210). Then the connection management unit 200 determines that the terminal 400 has attempted connection to request the contents, and shares the identifier of the DMS ($300_1$-$300_n$) connected to the home network, with the terminal 400. That is, the connection management unit 200 transmits the identification information message including the identifier of the DMS ($300_1$-$300_n$), to the terminal (S220).

The terminal 400 analyzes the identification information message and selects a specific DMS from the identifier of each DMS ($300_1$-$300_n$) (S230). Furthermore, the terminal 400 transmits the response message including the password allocated according to the DMS, to the connection management unit 200 (S240).

The connection management unit 200 analyzes the response message, and determines whether the password transmitted through the terminal 400 coincides with the password allocated according to the specific DMS (S250).

As a result of step S250, if the password allocated according to the specific DMS coincides with the transmitted password, the connection management unit 200 transmits a terminal information request message which requests the identifier of the terminal 400 (S260). The terminal 400 transmits the terminal information response message including its own identifier to the connection management unit 200 (S270). The connection management unit 200 receives the identifier of the terminal 400 and stores the identifier.

As a result of determination in step S250, if the password allocated according to the specific DMS does not coincide with the transmitted password, the connection management unit 200 transmits the connection termination message to block the connection of the terminal 400 to the indoor network (S280).

Figure 6:
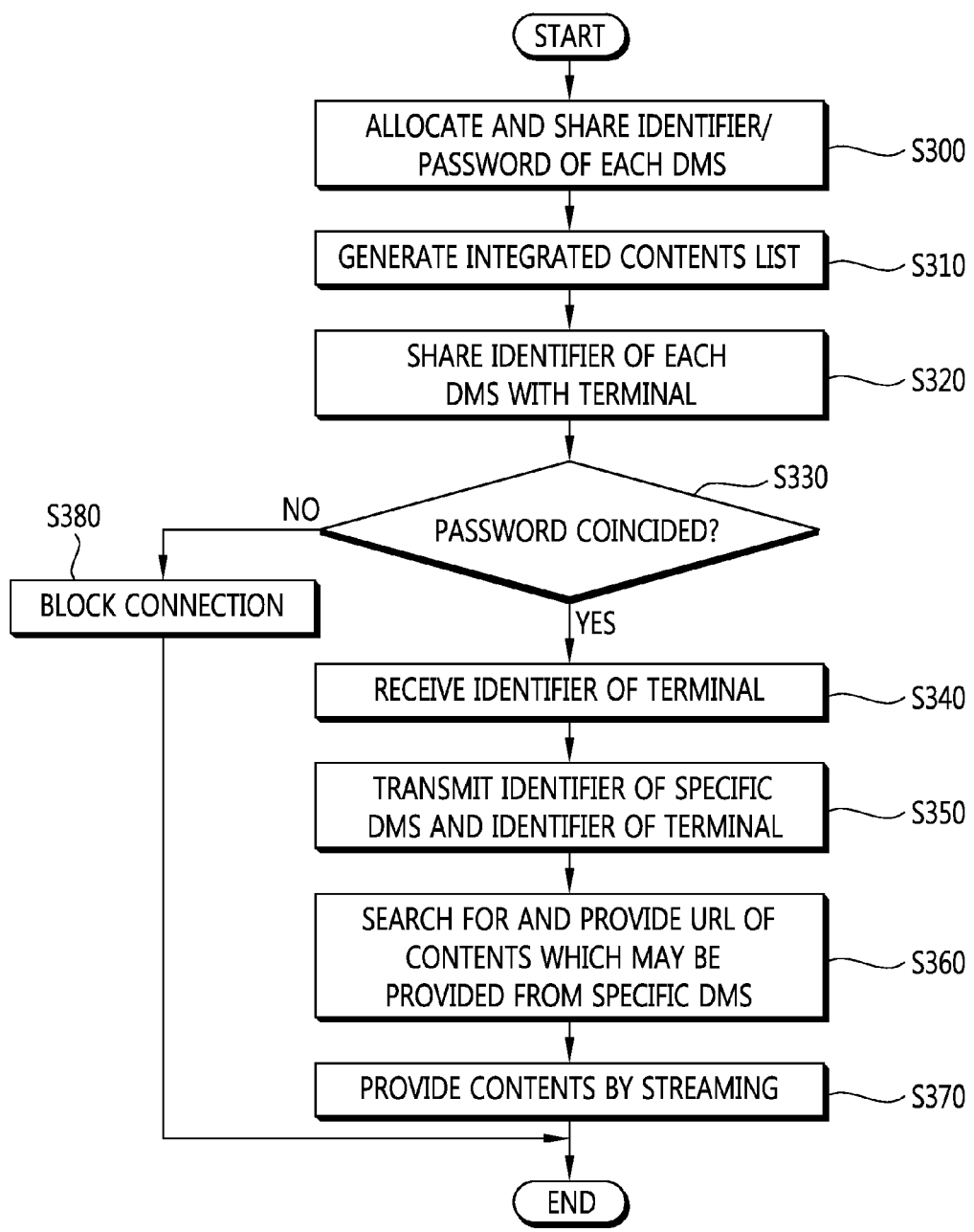
FIG. 6 is a flowchart illustrating a method of providing a DLNA-based cloud service according to an embodiment of the present invention.

FIG. 6 is a flowchart illustrating a method of providing a DLNA-based cloud service according to an embodiment of the present invention.

As illustrated in FIG. 6, the connection management unit 200 according to an embodiment of the present invention allocates the identifier and password of the DMS ($300_1$-$300_n$) connected to the home network 20. Furthermore, the connection management unit 200 shares the identifier and password of the DMS ($300_1$-$300_n$) with the integrated cloud providing unit 100 (S300).

The integrated cloud providing unit 100 receives information on the identifier and password of the DMS ($300_1$-$300_n$) from the connection management unit 200. The integrated cloud providing unit 100 integrates all contents information provided from the DMS ($300_1$-$300_n$) connected by the home network 20 as well as its own contents to generate an integrated contents list (S310).

At this time, when the terminal 400 located in an outdoor place attempts communication with the indoor network to request contents, the connection management unit 200 shares the identifier of the DMS ($300_1$-$300_n$) connected to the home network, with the terminal 400 (S320). If the user inputs the password for the specific DMS, the connection management unit 200 determines whether the password allocated to the specific DMS coincides with the inputted password (S330).

As a result of the determination of step S330, if the password allocated to the specific DMS coincides with the inputted password, the connection management unit 200 requests the identifier of the terminal 400. The terminal transmits its own identifier to the connection management unit 200. The connection management unit 200 receives the identifier of the terminal 400 and transmits the identifier of the terminal 400 and the identifier of the specific DMS to the integrated cloud providing unit 100 to notify that the terminal 400 located in an outdoor place requests provision of the contents (S350). The integrated cloud providing unit 100 searches for the URL of the contents which may be provided in the specific DMS, based on the integrated contents list. The integrated cloud providing unit 100 transmits the URL of the contents which may be provided from the specific DMS, to the terminal 400 (S360).

If the user selects one of the URLs of contents which are provided from the specific DMS, the integrated cloud providing unit 100 transmits the URL of the selected contents to the specific DMS so that the contents may be provided by streaming (S370).

Furthermore, as a result of the determination in step S330, if the password allocated to the specific DMS does not coincide with the inputted password, the connection management unit 200 blocks connection of the terminal 400 to the indoor network (S380).

According to the above-described apparatus and method for providing a cloud service, and the system having the same, all contents may be integrated and shared between indoor devices through a DLNA-based cloud service, and integrated contents may be provided to a terminal which is located in an outdoor place as well as an indoor place.

Furthermore, according to embodiments of the present invention, as the indoor integrated contents are provided to a terminal located in an outdoor place by streaming, various contents may be provided in real time without a separate conversion process for transmitting contents.

Furthermore, according to embodiments of the present invention, a DLNA-based cloud service may be provided to various terminals which are approached from an outdoor place as indoor integrated contents are provided to terminals which are connected by a private IP as well as terminals which are connected by a public IP from an outdoor place.

Furthermore, according to embodiments of the present invention, contents may be easily provided to terminals in an outdoor place by using indoor integrated contents without an inconvenient process that individual connections with the digital media server are made to receive contents from an outdoor place.

A person having ordinary skill in the art to which the present invention pertains may change and modify the present invention in various ways without departing from the technical spirit of the present invention. Accordingly, the present invention is not limited to the above-described embodiments and the accompanying drawings.

In the above exemplary system, although the methods have been described based on the flowcharts in the form of a series of steps or blocks, the present invention is not limited to the sequence of the steps, and some of the steps may be performed in a different order from that of other steps or may be performed simultaneous to other steps. Furthermore, those of ordinary skill in the art will understand that the steps shown in the flowchart are not exclusive and the steps may include additional steps or that one or more steps in the flowchart may be deleted without affecting the scope of the present invention.

What is claimed is:

1. A system for providing a cloud service, the system comprising:

an integrated cloud providing server configured to integrate contents information which is transmitted from a plurality of digital media servers (DMSs) which are connected to a first network, and provide contents to a terminal which is connected through a second network, based on the integrated contents information; and a connection management server configured to manage connection of the terminal to the first network using identification information of the DMSs, wherein the integrated cloud providing server classifies first contents in the integrated cloud providing server and second contents from the DMSs such that the integrated cloud providing server generates an integrated contents list including uniform resource locator (URL) information of the second contents, wherein the integrated contents list is transmitted to the terminal, wherein the integrated cloud providing server generates the integrated contents list by sending a content request message requesting contents information regarding contents that the DMSs maintain, to each of the DMSs in the first network, and receives the contents information, wherein the connection management server allocates original identifiers and passwords to the DMSs before receiving a request from the terminal, wherein the DMSs have different original identifiers and different passwords from each other such that access approval to a first one of the DMSs is made by pairing the original identifier and the password of the first DMS, wherein a set of identifiers for the DMSs is generated in a range of at least one DMS available at the time of each access request message through the second network from the terminal, and shared with the terminal through an identification information message, and wherein the contents selected by the terminal are transmitted to the terminal by streaming through the first network and the second network.

2. The system of claim 1, wherein the integrated cloud providing server searches for a URL of contents to be provided from the first DMS, based on the integrated contents list, when the terminal selects the contents of the first DMS.

3. The system of claim 2, wherein the integrated cloud providing server transmits the URL of the contents of the first DMS selected by the terminal to the first DMS to request the contents corresponding to the URL of the contents of the first DMS selected by the terminal to be provided by streaming.

4. The system of claim 1, wherein the connection management server blocks or approves connection of the terminal to the first network according to a result of checking the password if the terminal transmits the password for an identifier of a first DMS.

5. The system of claim 1, wherein the connection management server transmits an identifier of the terminal and the identifier of the first DMS to the integrated cloud providing server if connection of the first terminal to the first network is approved.

6. A method of providing a cloud service, the method comprising:
sharing, by a connection management server, identification information with an integrated cloud providing server by allocating identification information of a plurality of digital media servers (DMSs) which are connected by a first network;
determining, by the connection management server, whether to approve connection of a terminal which tries to connect to the first network through a second network using the identification information of the DMSs;
integrating, by the integrated cloud providing server, contents information which is transmitted from the DMSs; and
providing, by the integrated cloud providing server, contents to the terminal, based on integrated contents information if connection of the terminal is approved,
wherein the integrated cloud providing server classifies first contents in the integrated cloud providing server and second contents from the DMSs such that the integrated cloud providing server generates an integrated contents list including uniform resource locator (URL) information of the second contents,
wherein the integrated content list is transmitted to the terminal,
wherein the integrated cloud providing server generates the integrated contents list by sending a content request message requesting contents information regarding contents that the DMSs maintain, to each of the DMSs in the first network, and receives the contents information,
wherein the connection management server allocates original identifiers and passwords to the DMSs before receiving a request from the terminal,
wherein the DMSs have different original identifiers and different passwords from each other such that access approval to a first one of the DMSs is made by pairing the original identifier and the password of the first DMS,
wherein a set of identifiers for the DMSs is generated in a range of at least one DMS available at the time of each access request message through the second network from the terminal, and shared with the terminal through an identification information message, and
wherein the contents selected by the terminal are transmitted to the terminal by streaming through the first network and the second network.

7. The method of claim 6, wherein the integrating comprises:
searching, by the integrated cloud providing server, for a URL of contents to be provided from the first DMS, based on the integrated contents list, when the terminal selects the contents of the first DMS.

8. The method of claim 6, wherein the integrated cloud providing server transmits the URL of the contents of the first DMS selected by the terminal to the first DMS to request the contents corresponding to the URL of the contents of the first DMS selected by the terminal to be provided by streaming.

9. The method of claim 6, wherein
the connection management server blocks or approves connection of the terminal to the first network according to a result of checking the password if the terminal transmits the password for an identifier of the first DMS.

10. The method of claim 9, wherein
the connection management, server transmits an identifier of the terminal and the identifier of the first DMS to the integrated cloud providing server if connection of the first terminal to the first network is approved.

11. An apparatus for providing a cloud service, the apparatus comprising a processor configured to:
integrate contents information which is transmitted from a plurality of digital media servers (DMSs) which are connected to a first network;
search for contents which are selected by a terminal which is connected through a second network based on the integrated contents information; and
request contents selected by the terminal to be provided to the DMSs,
wherein the processor classifies first contents in a memory of the apparatus for providing an integrated cloud and second contents from the DMSs such that the processor generates an integrated contents list including URL information of the second contents,
wherein the integrated content list is transmitted to the terminal,
wherein the processor generates the integrated contents list by sending a content request message requesting contents information regarding content that the DMSs maintain, to each of the DMSs in the first network, and receiving the contents information,
wherein the processor allocates original identifiers and passwords to the DMSs before receiving a request from the terminal,
wherein the DMSs have different original identifiers and different passwords from each other such that access approval to a first one of the DMSs is made by pairing the original identifier and the password of the first DMS,
wherein a set of identifiers for the DMSs is generated in a range of at least one DMS available at the time of each access request message through the second network from the terminal, and shared with the terminal through an identification information message, and
wherein the contents selected by the terminal are transmitted to the terminal by streaming through the first network and the second network.

12. A method of providing a cloud service by an integrated cloud providing server, the method comprising:
integrating contents information which is transmitted from a plurality of digital media servers (DMSs) which are connected to a first network;
searching for contents which are selected by a terminal which is connected through a second network based on the integrated contents information; and
requesting contents selected by the terminal to be provided to the DMSs,
wherein the integrated cloud providing server classifies first contents in the integrated cloud providing server and second contents from the DMSs such that the integrated cloud providing server generates an integrated contents list including uniform resource locator (URL) information of the second contents,
wherein the integrated content list is transmitted to the terminal,
wherein the integrated cloud providing server generates the integrated contents list by sending a content request message requesting contents information regarding contents that the DMSs maintain, to each of the DMSs in the first network, and receives the contents information,
wherein the connection management server allocates original identifiers and passwords to the DMSs before receiving a request from the terminal,
wherein the DMSs have different original identifiers and different passwords from each other such that access approval to a first one of the DMSs is made by pairing the original identifier and the password of the first DMS, wherein a set of identifiers for the DMSs is generated in a range of at least one DMS available at the time of each access request message through the second network from the terminal, and shared with the terminal through an identification information message, and wherein the contents selected by the terminal are transmitted to the terminal by streaming through the first network and the second network.

* * * * *